United States Patent [19]
Kagan

[11] Patent Number: 5,986,451
[45] Date of Patent: Nov. 16, 1999

[54] LOW Z-HEIGHT LOADER FOR A HEAD GIMBAL ASSEMBLY

[75] Inventor: Aleksandr Kagan, San Jose, Calif.

[73] Assignee: Phase Metrics, Inc., San Deigo, Calif.

[21] Appl. No.: 08/741,574

[22] Filed: Oct. 30, 1996

[51] Int. Cl.⁶ ............................. G11B 21/12; G11B 5/455; G11B 5/56; G01R 33/12
[52] U.S. Cl. ............................ 324/210; 324/212; 360/105
[58] Field of Search ..................................... 324/210, 212; 360/105, 31

[56] References Cited

U.S. PATENT DOCUMENTS

| | | |
|---|---|---|
| Re. 30,118 | 10/1979 | Halfhill et al. . |
| 3,882,541 | 5/1975 | Ghose et al. . |
| 4,721,007 | 1/1988 | Entzminger . |
| 4,841,799 | 6/1989 | Entzminger . |
| 5,081,553 | 1/1992 | Wanlass et al. . |
| 5,124,865 | 6/1992 | Atesmen et al. . |
| 5,208,712 | 5/1993 | Hatch et al. . |
| 5,223,999 | 6/1993 | Suzuki ..................................... 360/105 |
| 5,299,081 | 3/1994 | Hatch et al. . |
| 5,463,514 | 10/1995 | Yaeger ..................................... 360/105 |
| 5,471,439 | 11/1995 | Katayama et al. .................. 360/105 X |
| 5,488,396 | 1/1996 | Burke et al. . |

*Primary Examiner*—Gerard Strecker
*Attorney, Agent, or Firm*—Blakely Sokoloff; Taylor & Zafman

[57] ABSTRACT

A method and apparatus for loading and unloading a slider onto the surface of a substrate. The present invention includes a suspension assembly that supports a slider having an air bearing surface. The suspension assembly is coupled to a guide rod that is biased toward a first, second and third bearing. The guide rod remains in continuous contact with at least two bearings. Movement of the slider toward or away from the substrate surface is accomplished by changing the position of one or more of the bearings. In this manner, a set of pivot points acting upon the guide rod is varied as the slider is rotated toward or away from the disk surface such that the axis of rotation of the slider varies as the slider is rotated toward or away from the substrate surface. The loader is also configured to minimize the lateral movement of the slider along the surface of the substrate as the slider is loaded or unloaded from the substrate surface.

40 Claims, 8 Drawing Sheets

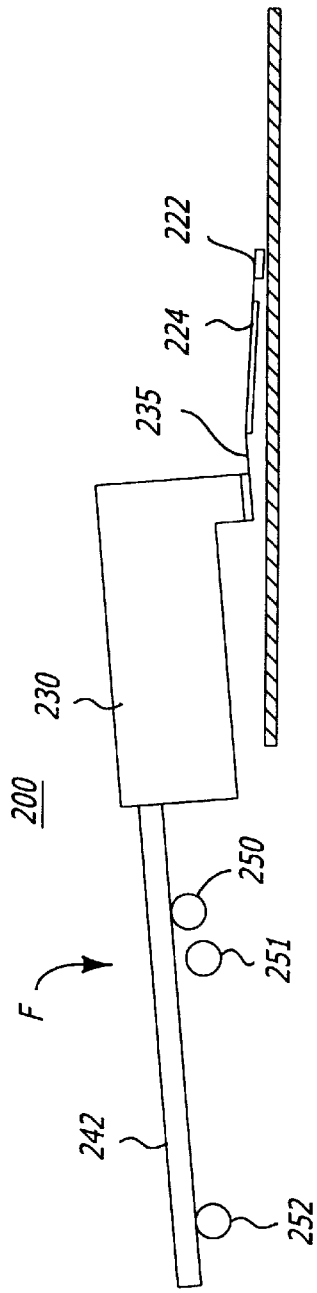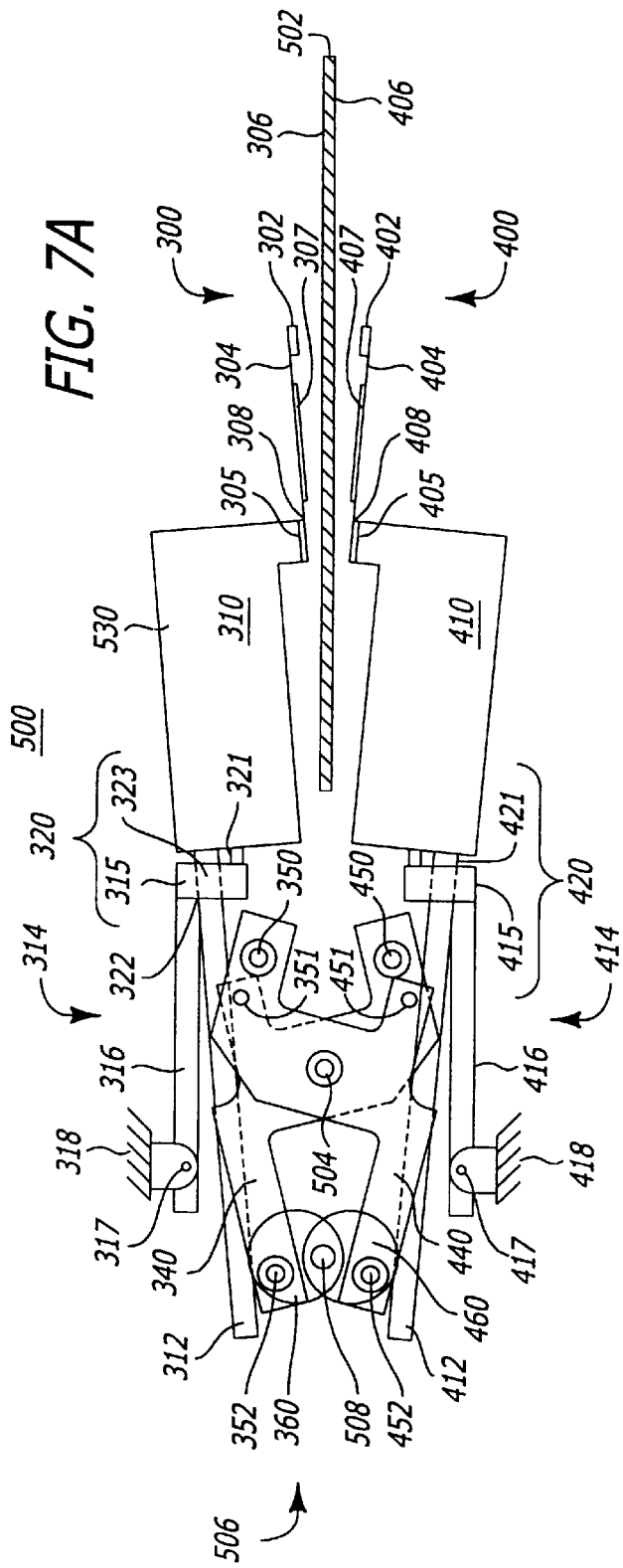

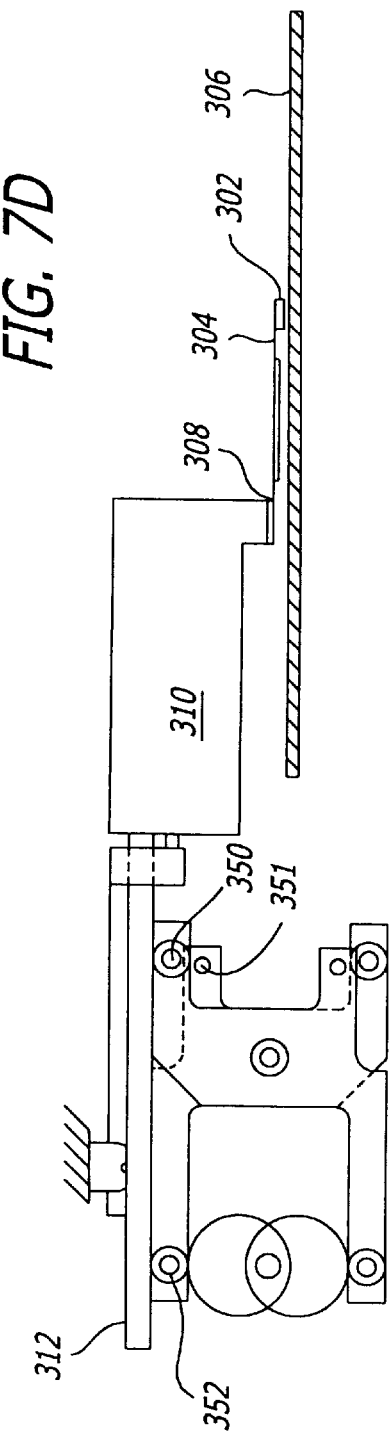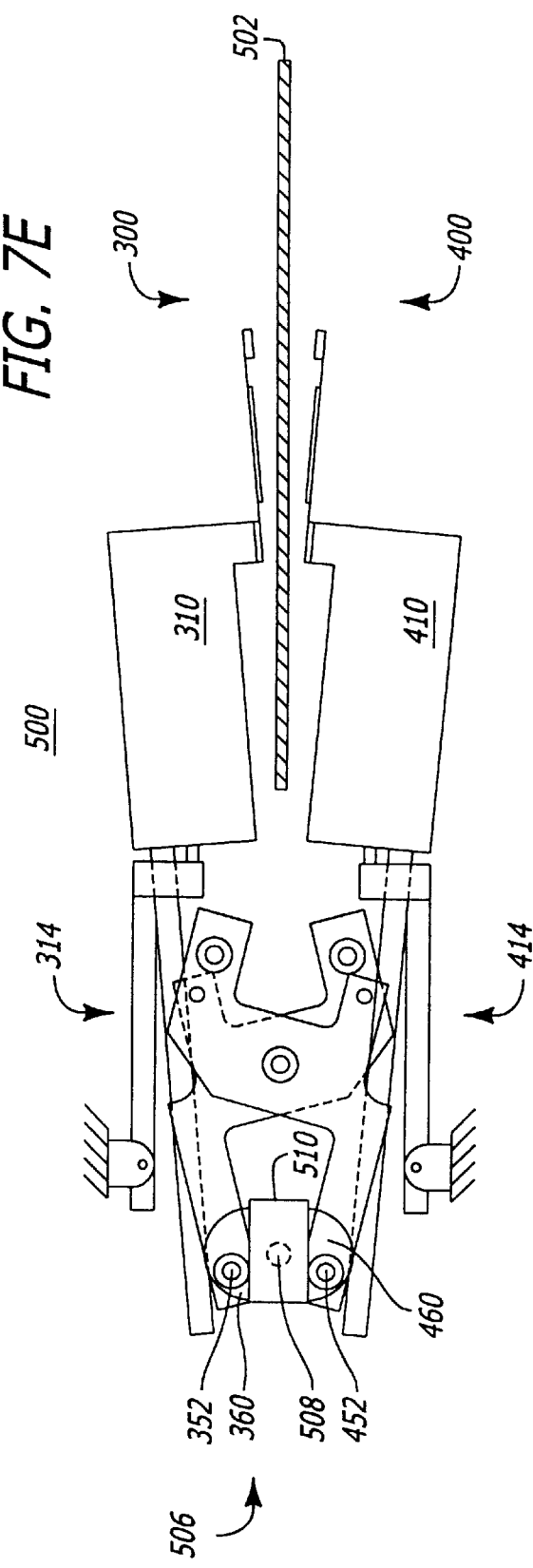

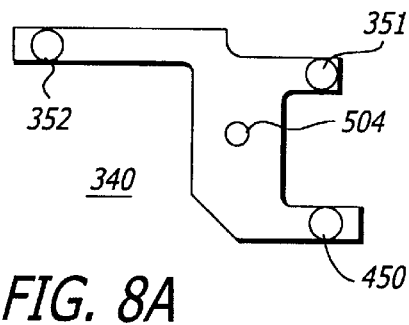
FIG. 8A
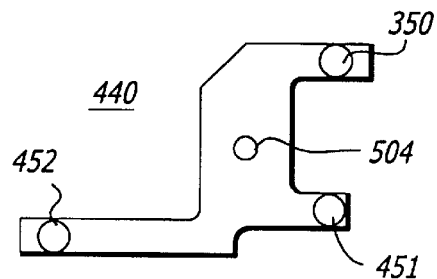
FIG. 8B
FIG. 9
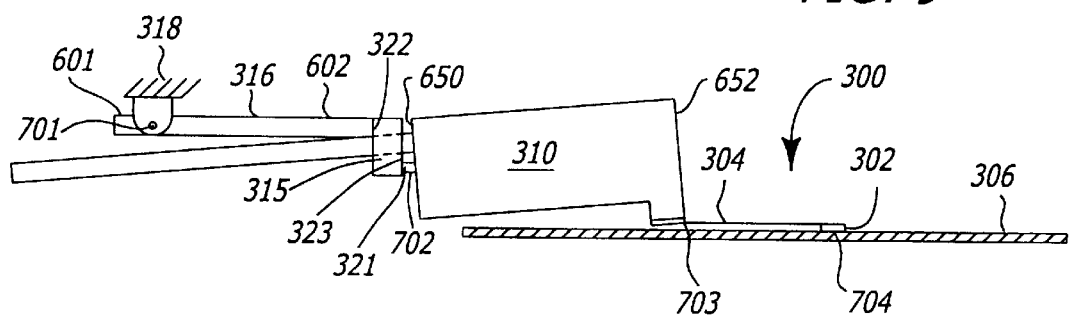
FIG. 10
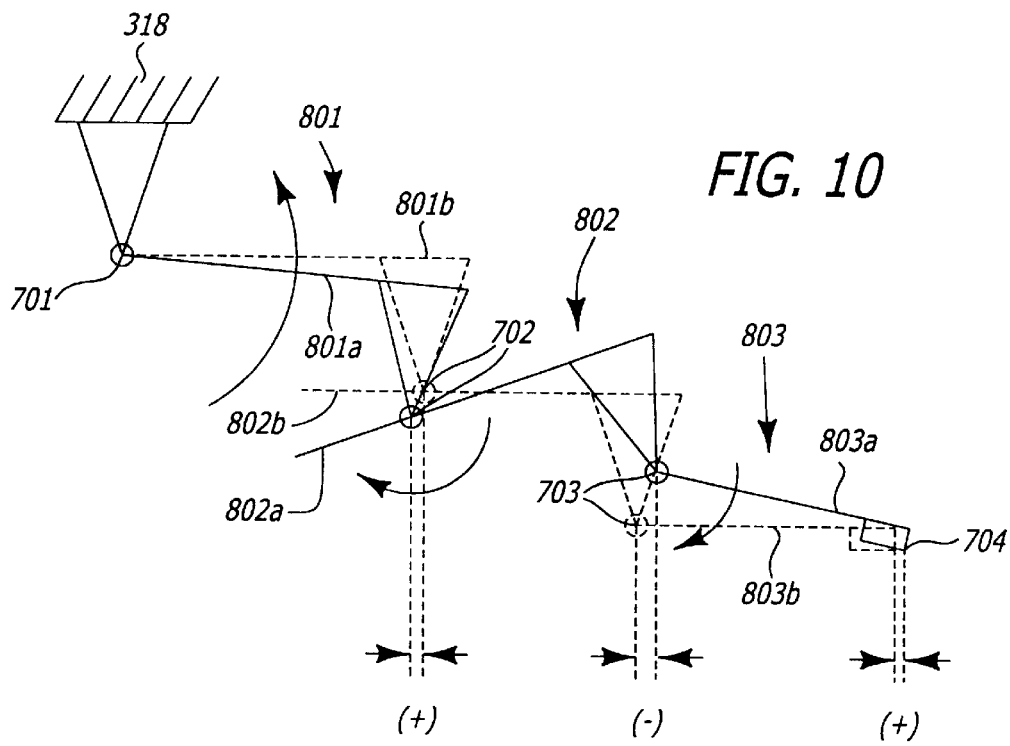

LOW Z-HEIGHT LOADER FOR A HEAD GIMBAL ASSEMBLY

FIELD OF THE INVENTION

The present invention relates to a loader for loading and unloading a head gimbal assembly onto a substrate or a rotating data recording medium.

BACKGROUND OF THE INVENTION

In recent years microcomputer equipment such as personal, desk top or lap top computers have become extremely popular for a wide range of business, educational and recreational uses. Such computers typically include a main central processor having one or more memory storage disks for the storage of data. The storage disk or disks are commonly provided as part of a so-called Winchester disk drive unit, sometimes referred to as a "hard" disk. Hard disk systems typically consist of one or more disks which are mounted and rotated by a common spindle. Each disk contains a plurality of narrow, closely spaced concentric tracks wherein serial data can be magnetically recorded for later recovery by a transducer positioned with respect to the desired track. Hard disk drives contain a transducer that magnetizes and senses the magnetic field of a rotating disk. The transducer is integrated into a slider that is typically gimbal mounted to a load beam that is cantilevered from an actuator. The load beam is pivoted by a voice coil motor which moves the slider radially across the surface of the magnetic disk from one data track to another. During operation the rotation of the magnetic disk causes the transducer to be aerodynamically lifted above the surface of the recording medium by an air bearing. This aerodynamic lifting phenomena results from the flow of air produced by the rotating magnetic disk. It is this air flow which causes the slider to "fly" above the disk surface.

During the development and post-manufacture processing of sliders and magnetic storage disks, a variety of tests are generally performed on the devices. For example, to ensure that the slider load beam assemblies comply with manufacturing tolerances, the flying height of a slider assembly is tested before installation into a disk drive. The surface of the magnetic storage disks are also routinely tested for defects. Tests to determine the wear resistance and durability of the slider air bearing surfaces and disk surfaces are also useful. In any event, the testing of either the slider or disk generally requires the periodic loading and unloading of a slider air bearing surface onto a surface of a substrate, such as a rotating magnetic disk.

FIG. 1 illustrates a typical magnetic recording head suspension assembly 100. The suspension assembly 100 includes a flexible load beam 104 that is attached to a slider 102 via a flexible gimbal device 105 at one end and a baseplate 106 at the other end. Baseplate 106 in turn is connected to an actuator, test loader, or other movement mechanism. Raised load rails 110 are provided along opposite sides of load beam 104. The load rails extend substantially perpendicular from the load beam and function as a stiffening member. Load beam 104 is generally bent towards the surface of a rotating magnetic disk 114 at a bend zone 112. Although bend zone 112 is shown located adjacent baseplate 106, it may also be placed along the central portion of the load beam nearer slider 102. The bend in the flexible load beam 104 provides a gram load force to slider 102 which opposes the aerodynamic lift force generated by the rotating disk 114. The resultant of the two opposing forces determines the flying height of the slider relative to the disk surface.

In order to minimize the disk-to-disk spacing in magnetic disk drives, the magnetic head slider suspension assemblies must have a low profile. The suspension assembly profile height is known as the "z-height." As shown in FIG. 1, the z-height 108 is the distance between the air bearing surface 103 of slider 102 and the mounting surface 109 of baseplate 106. In the past, heights in the range of 75 to 100 mils were common. However, as the packing density of disks within memory storage devices has increased, the z-height of the head slider suspension assemblies have accordingly diminished. Today, slider suspension assemblies having z-heights in the range of 20 to 30 mils are common.

As previously discussed, the testing of either the slider or disk generally requires the periodic loading and unloading of the slider onto the surface of a rotating disk. FIG. 2 illustrates a prior art test loader assembly 120 that is used to load and unload a slider 122 onto the surface of a disk 140. The slider suspension assembly 121 includes a slider 122 that is gimbal mounted to a load beam 124. A pair of raised rails 128 are positioned along both sides of load beam 124. Load beam 124 also includes a bend zone 125 located adjacent the load beam baseplate 126. The slider suspension assembly 121 is connected to a stationary mounting block 130 at baseplate 126. A lifter/bail assembly 133 having a lifting tab 136 extending from the end of a pivoting arm 134 is used to raise and lower slider 122 in proximity to disk surface 140. In operation, slider 122 is positioned onto disk surface 140 by pivoting lifter assembly 133 in a clockwise direction about an axis of rotation 137 that is parallel to disk surface 140. The clockwise rotation of lifter assembly 133 causes the preloaded load beam 124 to pivot towards the disk surface at bend zone 125. The subsequent removal of slider 122 from disk 140 is achieved by rotating the lifter assembly 133 about axis 137 in a counter-clockwise direction. It is important to note that lifting tab 136 should not make contact with the surface of the disk during the loading or unloading sequence. Such contact could result in damage to the surface of the disk and cause misalignment of the slider suspension assembly.

Low z-height slider suspension assemblies used in modern high density disk drives typically provide a clearance of approximately 8 mils between the load beam rails 128 and disk surface 140. Since the thickness of lifting tab 136 is approximately 4 mils, a clearance of approximately 2 mils is provided between each of the top and bottom surfaces of lifting tab 136 as it is positioned between the slider load rails 128 and disk surface 140. As a result, tolerances of about 0.5 mils are needed when setting the lifter assembly 133 position in relation to the slider suspension assembly. Such low tolerances make it difficult to properly align the lifter assembly. Moreover, the low tolerances reduce the robustness of the test apparatus. Another problem associated with the use of lifter assembly 133 to position slider 122 is that the repeated engagement and disengagement of lifting tab 136 with load beam 124 effectively reduces the flexibility of the load beam over time. Consequently, the gram load force provided by the load beam will diminish over time creating unwanted variations in test data.

Other prior art methods use a mechanical blade in lieu of a lifter/bail assembly to engage the load beam to position the slider away from the disk. Like the lifter/bail assembly discussed above, the mechanical blade apparatus results in a change of gram load force which makes it difficult to calibrate the test device Turning now to FIG. 3, a side view of another prior art test loader assembly 150 is shown that is used for loading and unloading a slider 152 onto a disk surface 161. Test loader 150 includes a slider suspension assembly 151. Suspension assembly 151 generally includes a flexible load beam 154 that is attached to a rotating mounting block 158 by a baseplate 156 disposed at one end of the load arm. Slider 152 is typically gimbal mounted to a load beam 154 at an end opposite baseplate 156. In addition, load beam 154 includes a bend zone 155 located adjacent load beam baseplate 156 and a pair of load rails 157 located along both sides of the load arm. Slider 152 is rotated toward and away from disk surface 160 by the rotational movement of mounting block 158 about a single axis of rotation at pivot 162. As illustrated, the distance 170 between the axis of rotation and slider is relatively large. Distance 170 varies, but is generally in the range of approximately 2 to 3 inches. The location of the slider's axis of rotation directly affects the angular position of the slider as it contacts the disk surface 160. More specifically, as the distance between the axis of rotation and the load beam bend zone 155 increases the contact angle between the slider and disk surface also increases. Conversely, as the distance between the axis of rotation and bend zone 155 decreases, the contact angle between the slider and disk surface also decreases. (Note that the portion of the load beam located between bend zone 155 and slider 152 is generally parallel to the slider air bearing surface when the slider is in a fully loaded position. Hence, the location of the axis of rotation in relation to the bend zone of load beam 154 is important.) FIG. 4 illustrates an enlarged view of slider 152 as the slider contacts the disk surface 161 of a disk 160. The contact angle, phi, is defined by the angle between a first plane 180 that is perpendicular to the slider air bearing surface 153, and a second plane 190 that is perpendicular to the disk surface 161.

It is desired to minimize the contact angle between the slider air bearing surface and disk surface. Ideally, the slider air bearing surface 153 and disk surface 161 should be parallel at the moment of contact. As the contact angle between the two surfaces increases, several problems arise. First, the likelihood of contacting an edge of the slider with the surface of the disk is increased. Such contact may scratch, or otherwise damage the disk's surface. In addition, as the contact angle increases the lateral movement of the slider across the surface of the disk also increases during the loading and unloading of the slider onto the disk surface. As shown in FIG. 4, slider 152 moves laterally across the disk surface 161 as it transverses from an initial contact angle to a zero contact angle at a fully loaded position. The lateral movement "A" of the slider across the disk surface is undesirable since it increases the wear of both the slider air bearing surface and the disk surface. Lateral movement of the slider is especially problematic when the slider is loaded onto a stationary disk.

What is needed then is a test loader that solves the aforementioned problems. As will be seen, the present invention provides a method and apparatus for loading and unloading a slider onto the surface of a substrate while eliminating the gram load loss problem associated with prior art test loaders. Further, the present invention provides a method and apparatus that minimizes the lateral movement of the slider along the disk surface as the slider is loaded and unloaded onto the disk surface. The present invention also minimizes the initial contact angle between a slider air bearing surface and the surface of a disk as the slider is loaded and unloaded onto the disk surface.

SUMMARY OF THE INVENTION

A method and apparatus for loading and unloading a slider onto the surface of a substrate is disclosed.

The present invention includes a suspension assembly that supports a slider. The suspension assembly is coupled to a guide rod that is biased toward a first, second and third bearing. The guide rod is in continuous contact with at least two bearings at any given time during the loading or unloading of the slider. Movement of the slider toward or away from the disk surface is accomplished by changing the position of one or more of the bearings. In this manner, a set of pivot points acting upon the guide rod is varied as the slider is rotated toward or away from the disk surface. As a result, the axis of rotation of the slider varies as the slider is rotated toward or away from the disk surface. In accordance with the present invention at least two separate axes of rotation are produced as the slider is moved toward or away from the disk surface. Each axis of rotation produces a different rotation motion. A first rotation motion is produced as the slider is rotated about a first axis of rotation that is located a first distance from the slider. A second rotation motion is produced as the slider is rotated about a second axis of rotation that is located at a second distance from the slider. The second axis of rotation is located at a distance nearer the bend zone of the load beam supporting the slider than the first axis of rotation.

In one embodiment of the present invention the slider is initially rotated toward the disk surface about the first axis of rotation. The displacement of the slider per degree of rotation of the slider (hereinafter referred to as the "displacement rate") about the first axis is relatively large during the first rotation motion. However, the axis of rotation shifts from the first axis of rotation to the second axis of rotation as the slider nears the disk surface. The shift in the axis of rotation causes the slider to move along the second rotation motion resulting in a reduced displacement rate. The angle between the air bearing surface of the slider and the surface of the disk (hereinafter referred to as the "angle of attack") is also reduced as the axis of rotation shifts from the first axis location to the second axis location. Hence, a controlled loading of the slider air bearing surface onto the surface of a disk is achieved. Unloading of the slider from the disk surface is accomplished by rotating the slider away from the disk surface about the second axis of rotation and first axis of rotation, respectively.

In yet another embodiment, the loading and unloading mechanism of the present invention includes a biasing mechanism, a mounting block, and a suspension assembly that supports the slider. The biasing mechanism includes a support beam that is attached to a stationary member at a first pivot point. The mounting block is coupled to the support beam at a second pivot point and the slider suspension assembly is coupled to the mounting block at a third pivot point. In accordance with the present invention, the geometric location and length of the support beam, mounting block and suspension assembly is selected to minimize the lateral movement of the slider across the disk surface as the slider is loaded or unloaded from the disk surface.

BRIEF DESCRIPTION OF THE DRAWINGS

The present invention is illustrated by way of example and is not limited by the figures of the accompanying drawings, in which like references indicate similar elements, and in which:

FIG. 6 illustrates a test loader in another embodiment of the present invention wherein the slider load beam includes a bend zone located along a central portion of the load beam.

FIGS. 7A–7E illustrate a test loader in another embodiment of the present invention as the test loader is positioned from a fully retracted (unloaded) position to a fully loaded position.

FIGS. 8A–8B illustrate the lever arm assemblies of a test loader in one embodiment of the present invention.

FIG. 9 illustrates the pivot point locations of the biasing mechanism and load assembly of the test loader depicted in FIGS. 7A–7D.

FIG. 10 illustrates the relative movement of the biasing mechanism and load assembly shown in FIG. 9 as the slider is loaded onto the disk surface.

DETAILED DESCRIPTION

A method and apparatus for loading and unloading a slider onto the surface of a data recording medium is described. In the following description, numerous specific details are set forth in order to provide a thorough understanding of the present invention. However, it will be obvious to one of skill in the art that the invention may be practiced without these specific details. In other instances, well known elements and processing techniques have not been shown or described in particular detail in order to avoid unnecessarily obscuring the present invention. In order to illustrate the need for an improved low z-height test loader, this discussion will mainly be limited to those needs associated with magnetic recording head suspension and slider assemblies. It will be recognized, however, that such focus is for descriptive purposes only and the apparatus of the present invention are applicable to any of a number of other test methods or apparatus used in conjunction with positioning a test device onto or near a substrate surface.

Figure 1:
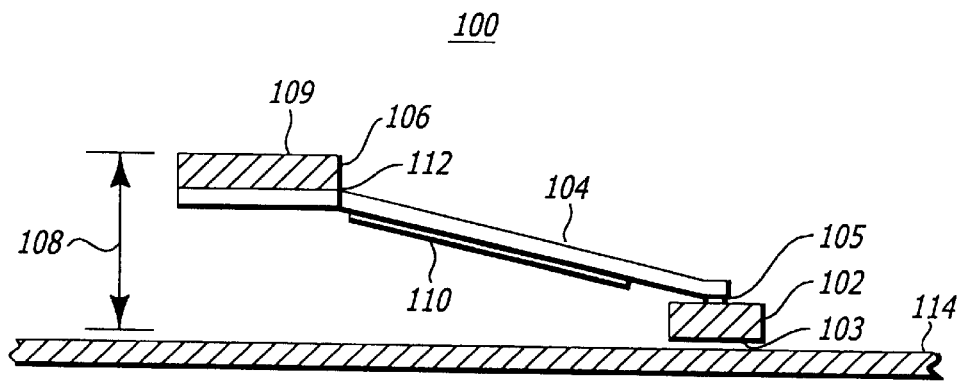
FIG. 1 illustrates a typical magnetic recording head suspension assembly.
Figure 4:
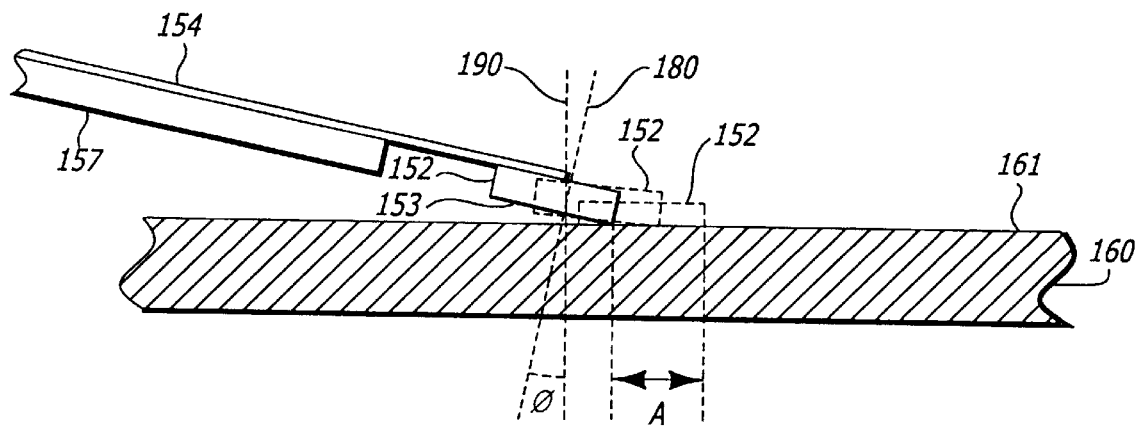
FIG. 4 illustrates an enlarged view of the slider and disk surface shown in FIG. 3 as the slider is loaded onto the disk surface.
Figure 2:
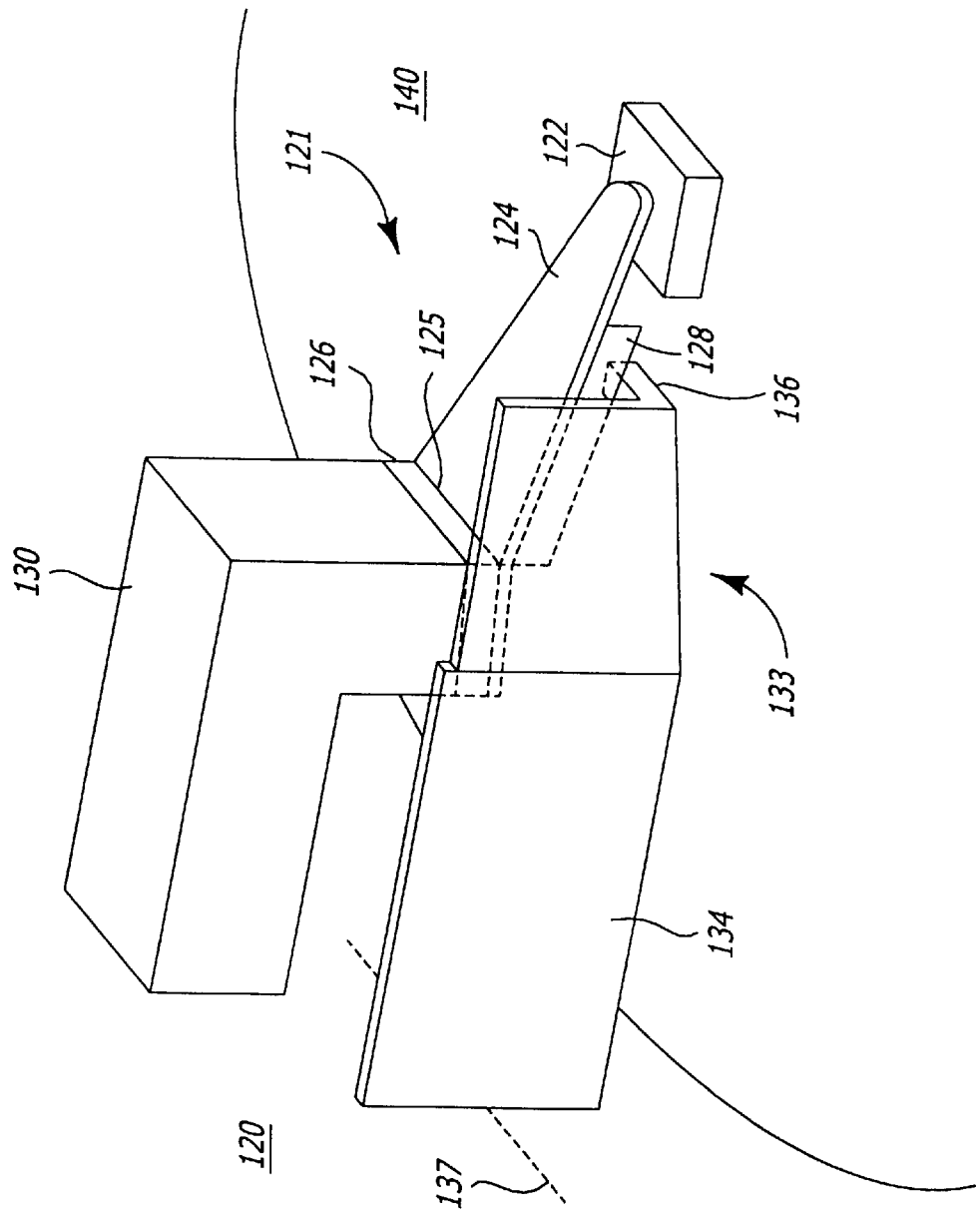
FIG. 2 illustrates a perspective view of a prior art test loader assembly.
Figure 3:
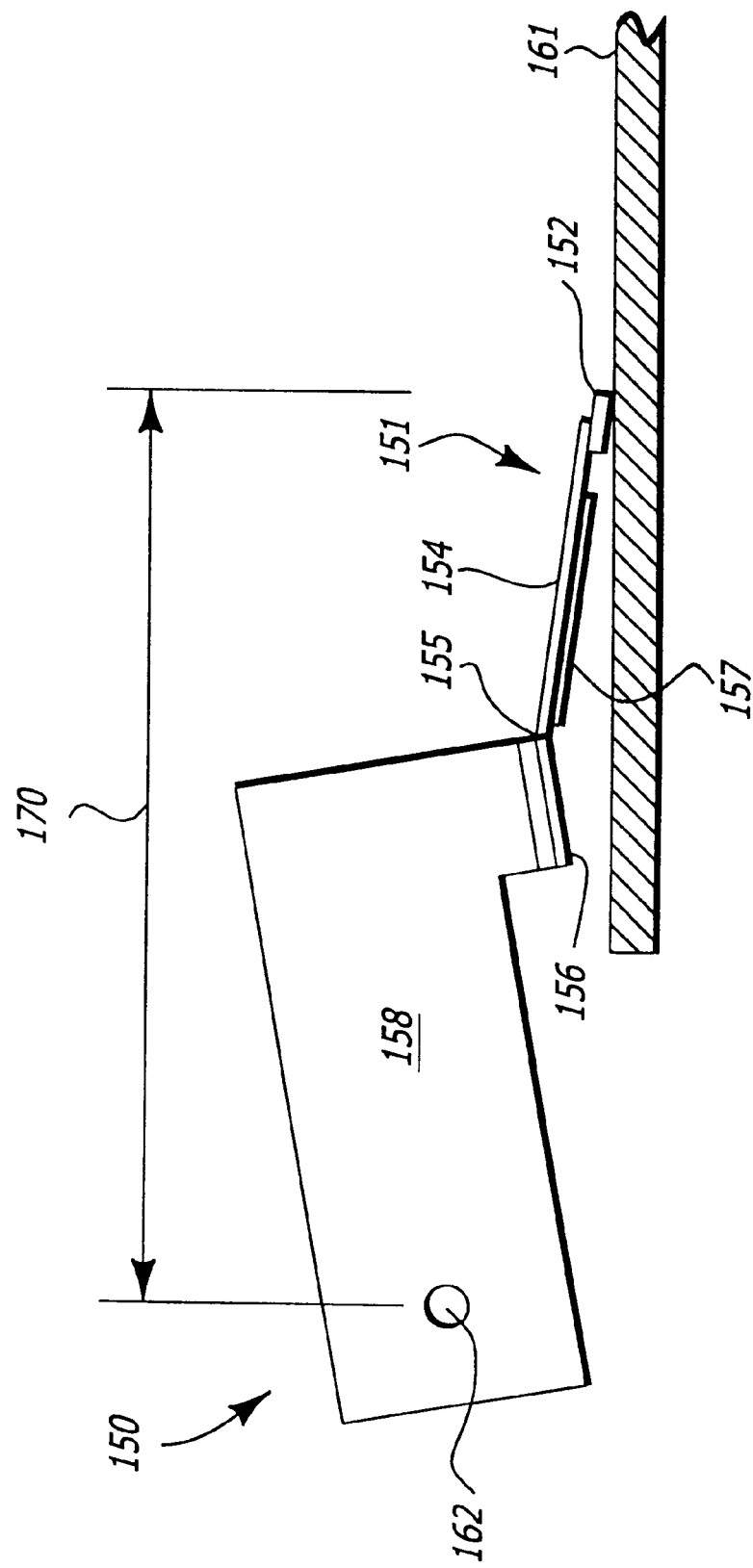
FIG. 3 illustrates another prior art test loader assembly.
Figure 5A:
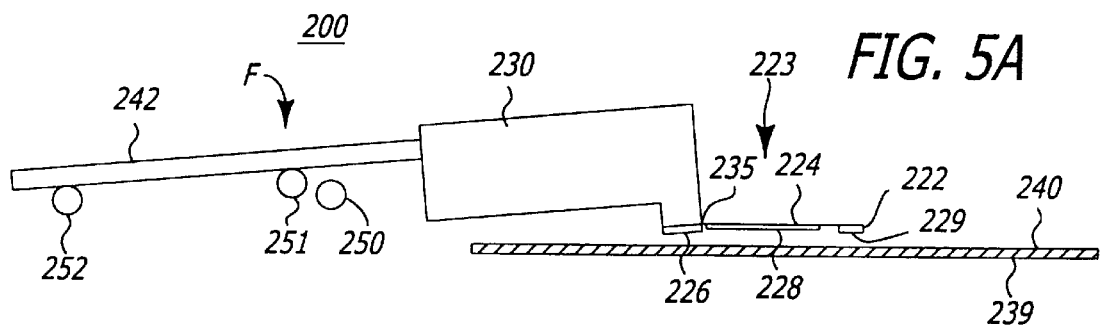
FIGS. 5A–5D illustrate a test loader of one embodiment of the present invention as the test loader is positioned from a fully retracted (unloaded) position to a fully loaded position.

Referring to the drawings more particularly by reference numbers, FIGS. 5A through 5D show a test loader 200 for loading and unloading a slider 222 onto a surface 240 of a rotating disk 239. FIG. 5A shows test loader 200 in a retracted (unloaded) position. In one embodiment tester 200 comprises a mounting block 230 that is attached to a guide rod 242. Guide rod 242 is biased toward a first bearing 250, a second bearing 251 and a third bearing 252 by a force, F. Slider 222 is supported by a suspension assembly 223 that is attached to mounting block 230. Suspension assembly 223 comprises a load beam 224 having a baseplate 226 at one end for coupling the load beam to mounting block 230. Load beam 224 generally includes gimbal assembly (not shown) at an end opposite baseplate 226 for coupling slider 222 to the load beam. Load beam 224 is generally bent towards the surface 240 of rotating disk 239 at a bend zone 235. Although the bend zone 235 is shown located adjacent baseplate 226, it may also be placed along a central portion of the load beam 224 closer to slider 222 as depicted in FIG. 6. The bend in the flexible load beam 224 provides a gram load force to slider 222. Load beam 224 includes a set of rails 228 extending substantially perpendicular to the load beam. The load rails provide a desired stiffness to change the natural frequency of the load beam. The change in natural frequency inhibits the vibration of the load beam during loading and unloading operations.

As illustrated in FIGS. 5A–5D, slider 222 is loaded onto surface 240 by rotating slider 222 toward surface 240. The rotation of slider 222 toward surface 240 is accomplished by pivoting guide rod 242 along a set of pivot points that are defined by the first, second and third bearings, 250–252, respectively. In accordance with the present invention, the set of pivot points vary as the slider is rotated toward surface 240 such that an axis of rotation of the slider varies as slider 222 is rotated toward surface 240. For example, in one embodiment the axis of rotation of slider 222 moves from a first location located at or near second bearing 251, to a second location located nearer bend zone 235 of load beam 224. By moving the slider axis closer in proximity to the bend zone 235 of load beam 224, those problems associated with prior art test loaders are minimized. Namely, the initial contact angle between the slider air bearing surface 229 and disk surface 240 is reduced. This provides several advantages. First, the likelihood of contacting an edge of the slider with the surface of the disk is reduced as the slider is loaded or unloaded from the disk surface. This reduces the risk of damage to the disk surface. In addition, the motion of the slider is changed in a manner that reduces the lateral movement of the slider along the disk surface as the slider is loaded or unloaded from the disk surface. Moreover, the test loader of the present invention obviates the need to use an external lifter assembly to unload the slider from the disk surface. The gram load loss problem associated with prior art test loaders is therefore eliminated.

Figure 5B:
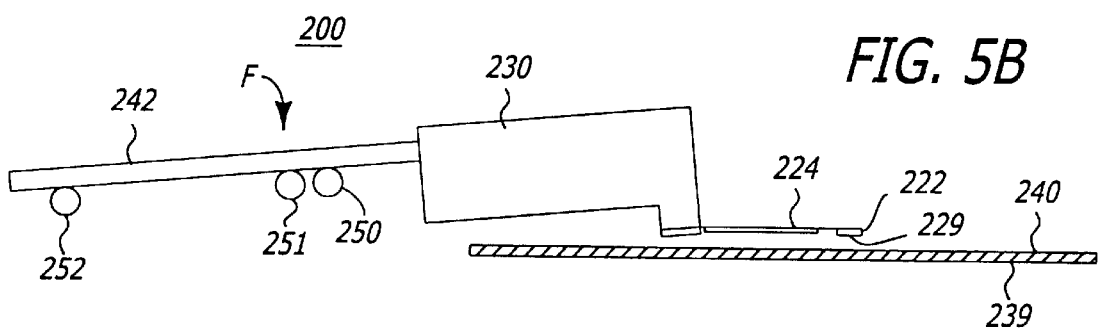

In one embodiment of the present invention guide rod 242 is spring biased toward first, second and third bearings 250–252. Guide rod 242 remains in continuous contact with at least two bearings during the loading and unloading sequence. Generally, a movement mechanism is attached to third bearing 252 to move the third bearing in relation to the first and second bearings, 250 and 251. As such, the movement of slider 222 from an unloaded position to a loaded position is accomplished by displacing the third bearing 252 in a generally upward direction against guide rod 242. The displacement of third bearing 252 causes slider 222 to rotate about a first axis of rotation as guide rod 242 engages second bearing 251. (See FIG. 5A.) As third bearing 252 continues to be displaced in a generally upward direction, guide rod 242 simultaneously engages the first bearing 250 and the second bearing 251, as depicted in FIG. 5B. The engagement of guide rod 242 with first bearing 250 causes the axis of rotation of slider 222 to shift from the first axis of rotation to a second axis of rotation. The second axis of rotation is preferably located at or near bend zone 235 of load beam 224. It is appreciated that the precise location of the first and second axes of rotation of slider 222 are dependent upon a number of design factors including: (1) the relative placement and configuration of first, second and third bearings 250–252, (2) the movement path of each bearing, (3) the shape or curvature of guide rod 242, (4) the shape and dimensions of bearings 250–252, etc.

A salient feature of the present invention lies in the test loader's ability to control the movement path of slider 222 during the rotation of the slider toward and away from disk surface 240. When the test loader is in a fully unloaded position, that is, when slider 222 is at a maximum distance from surface 240, a first slider motion is produced as the slider is rotated about the first axis of rotation. Since the first axis of rotation is located at a relatively large distance from the slider, the displacement of the slider per degree of rotation about the first axis is relative large. As a result, the initial displacement rate of the slider as it is moved toward the disk surface is relatively large. As the slider nears the disk surface, the axis of rotation of the slider shifts from the first axis of rotation to the second axis of rotation. A second slider motion is produced as the slider is rotated about the second axis of rotation. The second slider motion differs from the first slider motion in at least two ways. First, the displacement rate of the slider is reduced between the first and second slider motions. This feature allows the slider to be moved toward the disk surface at a higher displacement rate when the slider is positioned at a relatively large distance from the disk surface. As slider 222 is positioned near disk surface 240, the displacement rate of the slider is reduced during the second slider motion to provide a more precise control of the slider.

Figure 5C:
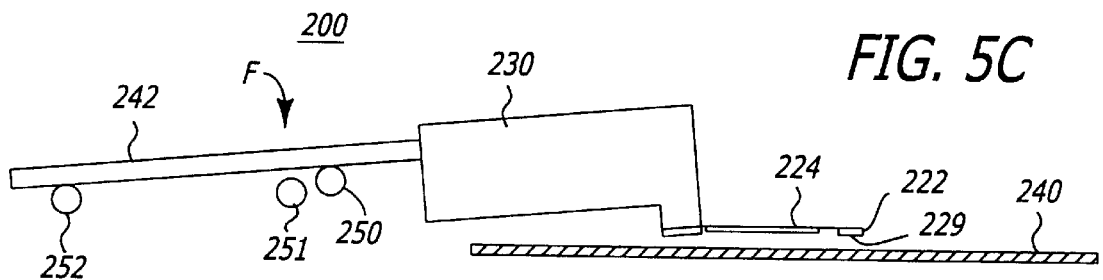
Figure 5D:
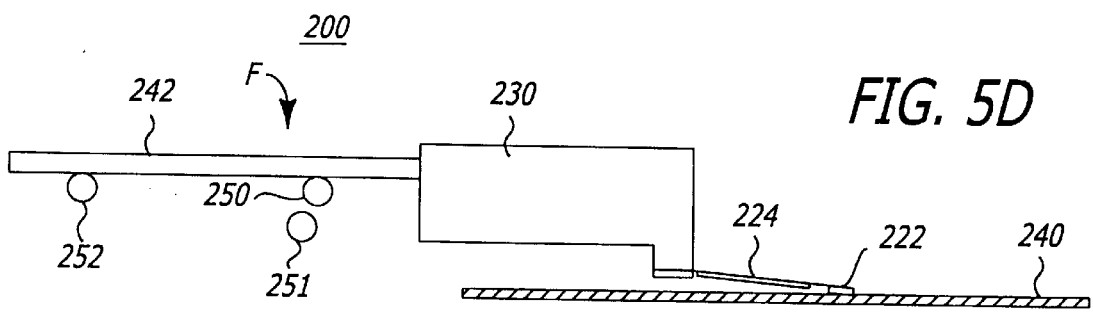

By providing at least two separate slider motions in the manner described, the amount of time necessary to complete a full load and unload cycle is diminished while the precision of the slider placement onto the disk surface is increased. The angle of attack between the slider air bearing surface 229 and disk surface 240 is also reduced between the first and second slider motions. This feature provides several advantages. First, the likelihood of contacting an edge of the slider with the surface of the disk is reduced, thereby reducing the risk of damage to the disk surface. In addition, the motion of the slider is changed in a manner that reduces the lateral movement of the slider along the disk surface as the slider is loaded or unloaded onto the disk surface. FIGS. 5C and 5D show the relative positions of the test loader components as slider 222 is loaded onto disk surface 240.

The movement of slider 222 from a loaded position to an unloaded position is accomplished by displacing the third bearing 252 in a generally downward direction. As bearing 252 moves in a generally downward direction, biasing force, F, acts upon guide rod 242 to rotate the mounting block 230 in an upward direction. The upward movement of mounting block 230 causes load bean 224 and slider 222 to rotate upward away from disk surface 240. During the loading sequence, slider 222 follows a path just opposite to that followed during the unloading sequence. In other embodiments, the path of slider 222 as it is retracted from surface 240 may vary from the path followed during the loading of the slider.

Although the discussion of the test loader of the present invention has thus far been described as comprising three bearings, a guide rod, a mounting block and a slider suspension assembly, it is understood that the spirit and scope of the present invention is not limited to any one specific embodiment. It is appreciated that the benefits of the present invention may be achieved with a variety of other test loader configurations. For example, the number of bearings, the shape of the guide rod, the method of linking the guide rod to the slider suspension assembly, the manner in which movement is imparted to the guide rod, the relative motion between each bearing, the relative motion between the bearings and guide rod, the relative distance between the test loader component parts, etc., may be altered without deviating from the spirit or scope of the present invention.

Figure 7B:
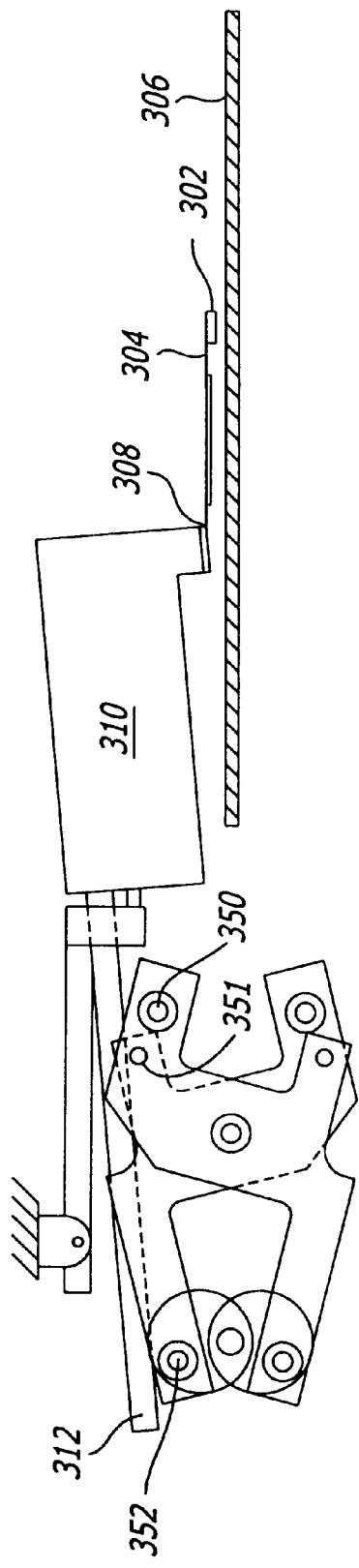

FIGS. 7A–7D illustrate a test loader 500 in an embodiment of the present invention as the test loader is positioned from a fully retracted (unloaded) position (FIG. 7A) to a fully loaded position (FIG. 7D). Test loader 500 accommodates the loading and unloading of two sliders 302 and 402 onto opposite sides 306 and 406 of a substrate 502. Substrate 502 may include a rotating data recording medium, such as a magnetic recording or optical disk. In lieu of a rotating disk, substrate 502 may include a stationary load surface.

Test loader assembly 500 comprises a set of mounting blocks 310 and 410, two guide rods 312 and 412, six bearings 350–352 and 450–452, two lever arms 340 and 440 and two cams 360 and 460. Two biasing mechanisms 314 and 414 are included to provide biasing forces to guide rods 312 and 412, respectively. A spring (not shown), or other biasing mechanism well known in the art, is generally coupled to guide rods 312 and 412 to provide a biasing force between guide rods 312 and 412 and bearings 350–352 and 450–452, respectively. In order to more clearly illustrate the operation of test loader 500, the discussion of FIGS. 7A–7D will focus primarily on the manner in which slider 302 is loaded and unloaded onto surface 306. It is appreciated that slider 402 is loaded and unloaded onto surface 406 in a similar manner.

As illustrated in FIG. 7A, suspension system 300 comprises a load beam 304 with slider 302 being attached to one end. Typically, slider 302 is gimbal mounted to load beam 304. Load beam 304 is attached to mounting block 310 at its opposite end by baseplate 305. Raised load rails 307 are generally provided laterally along opposite sides of load beam 304. The load rails extend substantially perpendicular from the load beam and function as a stiffening member. Load beam 304 is generally bent towards surface 306 at a bend zone 308. Although bend zone 308 is shown located adjacent baseplate 305, the bend may also be placed along a central portion of the load beam. The bend in the flexible load beam 304 provides a gram load force to slider 302 as it is loaded onto surface 306.

The loading of slider 302 onto surface 306 is accomplished by moving mounting block 310 in a direction toward surface 306. Attached to mounting block 310 is an elongated guide rod 312 and biasing mechanism 314. Biasing mechanism 314 includes a support beam 316 that is pivotally coupled at one end to a stationary member 318 at pivot 317. The opposite end of support beam 316 is coupled to mounting block 310 by a leaf spring portion 320. In one embodiment, leaf spring portion 320 comprises a block member 315 and a leaf spring 321. Block member 315 is coupled to support beam 316 at a first side 322. Block member 315 is coupled to mounting block 310 by leaf spring 321 that extends outwardly along a second side 323 of member 315. The biasing mechanism provides a biasing force to mounting block 310 which acts upon guide rod 312. The bearings are coupled to a set of lever arms 340 and 440 that are rotatably coupled to a stationary member (not shown) about a common axis of rotation 504.

In one embodiment, each of lever arms 340 and 440 possess three bearings. As illustrated in FIGS. 8A and 8B, lever arm 340 includes bearings 351, 352 and 450 while lever arm 440 includes bearings 451, 452 and 350. Bearings 350–352 and 450–452 may comprise pins that protrude from the respective lever arms. Miniature ball bearings, or a combination of pins and ball bearings, may also be used. Each of lever arms 340 and 440 is coupled to a cam assembly 506 at bearings 352 and 452, respectively. Cam assembly 506 comprises a first disk 360 and a second disk 460 that are coupled to a motor or other movement mechanism 510 (shown in FIG. 7E) at a common axis of rotation 508. As illustrated in FIGS. 7A–7D, guide rod 312 remains in continuous contact with bearing 352 and at least one of either bearings 350 or 351 as slider 302 is loaded and unloaded onto surface 306.

The movement of slider 302 from an unloaded position to a loaded position is accomplished by displacing bearing 352 in a generally upward direction against guide rod 312. Movement of bearing 352 is achieved by rotating cam disk 360 about axis 508. Since cam disks 360 and 460 are coupled at a common axis of rotation, a corresponding movement of bearing 452 is created as cam disk 460 is rotated in conjunction with cam disk 360. The movement of bearings 352 causes lever arm 340 to rotate about axis 504. Likewise, the movement of bearing 452 causes lever arm 440 to rotate about axis 504. Thus, as bearing 352 is moved in an upward direction, lever arm 340 rotates in a clockwise direction causing bearings 351 and 450 to move in a generally downward direction. The corresponding movement of bearing 452 in a downward direction causes lever arm 440 to rotate in a counter-clockwise direction. The counter-clockwise rotation of lever arm 440 causes bearings 350 and 451 to move in a generally upward direction.

In FIG. 7A, test loader 500 is shown in a fully retracted position. While the test loader is in the fully retracted position, guide rod 312 is biased against bearings 352 and 351. The movement of slider 302 from an unloaded position to a loaded position is accomplished by initially displacing bearing 352 in an upward direction to cause guide rod 312 to pivot along the surface of bearing 351. As guide rod 312 pivots about bearing 351, slider 302 is rotated toward surface 306 about a first axis of rotation. In the embodiment of FIG. 7A, the first axis of rotation is located at axis 504. As bearing 352 is moved in an upward direction, the rotation of lever arms 340 and 440 causes bearings 350 and 351 to move in an upward and downward direction, respectively. Hence, as slider 302 is loaded onto surface 306, the relative position between each of bearings 350–352 and guide rod 312 changes.

Figure 7C:
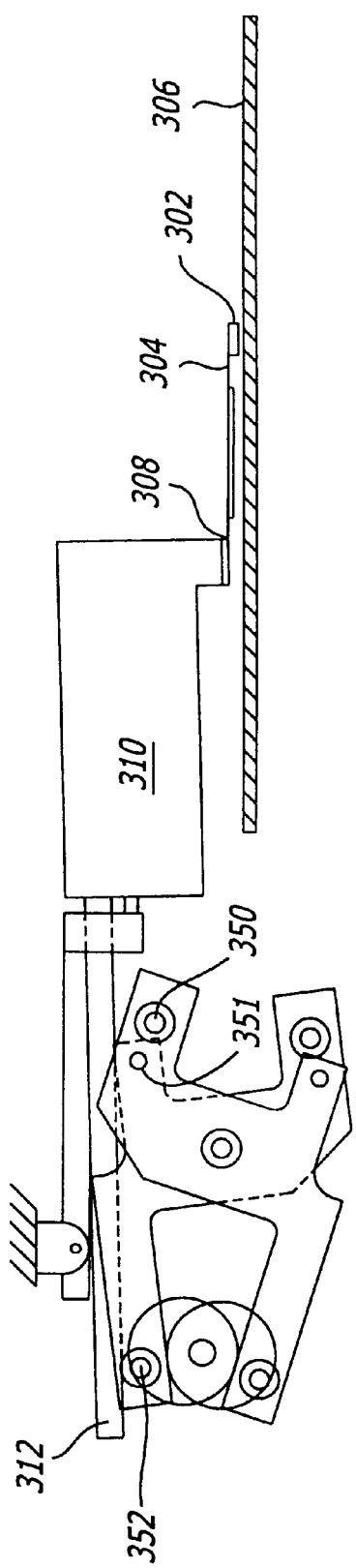

FIGS. 7B–7D illustrate the relative position of bearings 350–352, and guide rod 312, as slider 302 is loaded onto surface 306. As illustrated in FIG. 7B, as slider 302 is rotated toward surface 306, guide rod 312 and bearing 350 move in a direction toward one another. As slider 302 nears surface 306, guide rod 312 engages with bearing 350 as depicted in FIG. 7C. The geometric relationship of the test loader component parts, in conjunction with the motion provided by the cam assembly 506 and lever arms 340 and 440, cause the axis of rotation of slider 302 to shift from axis 504 to an axis of rotation located near the bend zone 308 of load beam 304. As a result, the rotation motion of slider 302 is changed as the slider is rotated near surface 306. The benefits associated with the change in rotational movement are discussed above.

FIG. 7D illustrates the relative position of the tester component parts when slider 302 is in a fully loaded position with surface 306.

The movement of slider 302 from a loaded position to an unloaded position is accomplished by displacing the third bearing 352 in a generally downward direction. As bearing 352 moves in a generally downward direction, biasing mechanism 314 acts upon guide rod 312 to rotate mounting block 310 in an upward direction. The upward movement of mounting block 310 causes load beam 304 and slider 302 to rotate upward away from surface 306. During the unloading sequence, the movement of bearings 350–352 and guide rod 312 follow a path just opposite to that followed during the loading sequence. This again produces at least two distinct rotation motions of slider 302 as the slider is unloaded from surface 306.

In accordance with the embodiment illustrated in FIGS. 7A–7D, slider 402 is loaded and unloaded onto surface 406 by the sequential engagement of guide rod 412 with bearings 450–452. Slider 402 is usually gimbal mounted in suspension system 400 to one of a load beam 404 which is attached to a mounting block 410 at its opposite end by a baseplate 405. Raised load rails 407 are generally provided laterally along opposite side of load beam 404. Biasing mechanism 414 provides a biasing force to guide rod 412. As previously discussed, another biasing mechanism, such as a spring, or other well known biasing mechanism, is generally coupled to guide rod 412. Biasing mechanism 414 includes a support beam 416 that is pivotally coupled at one end to a stationary member 418 at pivot 417. The opposite end of support beam 416 is coupled to mounting block 410 by a leaf spring portion 420, which in one embodiment comprises a block member 415 and a leaf spring 421. The loading and unloading of slider 402 onto surface 406 is achieved in a similar manner to that described above in conjunction with the loading and unloading of slider 302 onto surface 306. The only difference is that the upward and downward movement of bearings 450–452 and guide rod 414 are just opposite the upward and downward movement of bearings 350–352 and guide 312.

Although the embodiment of FIGS. 7A–7D is directed at simultaneously loading and unloading two sliders, it is appreciated that the present invention may be directed at loading and unloading a single slider. Moreover, it is important to note that the present invention may be implemented in any of a variety of ways. It is, therefore, appreciated that the geometric configuration of the test loader components, and the relative shape and dimension of the components may vary significantly depending upon the particular application.

As previously discussed, it is important to minimize the lateral movement of the slider along the surface of the disk as the slider is loaded onto the disk surface, or unloaded from the disk surface. One method of minimizing the lateral movement of the slider across the surface of the disk is to locate the axis of rotation of the slider at or near the bend zone of the slider load arm as discussed above. The lateral movement of the slider may also be controlled by varying the length and geometric location of the test loader support beam 316, mounting block 310 and slider suspension assembly 300. As illustrated in FIG. 9, support beam 316 is pivotally coupled at a first end 601 to a stationary member 318 at a first pivot point 701. The opposite end 602 of the support beam 316 is pivotally coupled to a first side 650 of mounting block 310 at a second pivot point 702 located along leaf spring 321. A block member 315 is coupled to support beam 316 at a first side 322. Block member 315 is coupled to mounting block 310 by leaf spring 321 that extends outwardly along a second side 323 of block member 315. The slider suspension assembly 300 is coupled to mounting block 310 and extends from a second side 652 of the mounting block as illustrated in FIG. 9. The flexible load arm 304 of slider suspension assembly 300 bends at a third pivot point 703 as the slider 302 makes contact with the disk surface 306. A fourth pivot point 704 is established at the slider 302 and disk surface 306 interface as the slider is loaded or unloaded from the disk surface.

FIG. 10 illustrates the relative motion of the support beam, mounting block, suspension assembly, and their respective pivot points 701–703 as slider 302 is loaded onto the disk surface 306. Support beam 316, mounting block 310 and suspension assembly 300 are represented by elements 801, 802 and 803, respectively. Elements 801a–803a show the position of the load assembly elements 801–803 as the slider 302 makes initial contact with disk surface 306. Elements 801b–803b show the position of the load assembly elements when slider 302 is in a fully loaded position. As slider 302 is loaded onto the disk surface, the position of pivot points 702–704 change in both an "x" and "y" direction. The lateral movement of slider 302 as it is loaded onto the surface of a disk is determined by the net displacement of pivot points 702, 703 and 704 as measured in the "x" direction. As illustrated in FIG. 10, each of pivot points 702 and 704 is displaced in a positive "x" direction as the slider is loaded onto the surface of the disk. Pivot point 703 is displaced in a negative "x" direction which acts to minimize the overall displacement of the slider in the positive "x" direction thus minimizing the lateral movement of the slider along the disk surface. The relative displacement of pivot points 702, 703 and 704 may be adjusted by changing the geometric location of the pivot points and/or varying the length of elements 801–803. In addition, it is appreciated that the benefits of the present invention may be used in conjunction with other loader assembly configurations.

Whereas many alternations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

What is claimed is:

1. A method for loading a slider onto a surface of a substrate, said slider being connected to a load arm, said load arm pivoting about a set of pivot, points said method comprising the steps of:
   rotating said slider toward said surface; and
   varying the position of each of said pivot points as said slider is rotated toward said surface such that an axis of rotation of said slider moves from a first location to a second location.

2. The method of claim 1 wherein said second location is located at a distance nearer said slider than said first location.

3. The method of claim 1 wherein said substrate is a rotating magnetic recording medium.

4. A method of unloading a slider from a surface of a substrate, said slider being connected to a load arm, said load arm pivoting about a set of pivot points, said method comprising the steps of:
   rotating said slider away from said surface; and
   varying the position of each of said pivot points as said slider is rotated away from said surface such that an axis of rotation of said slider moves from a first location to a second location as said slider is rotated away from said surface.

5. The method of claim 4 wherein said second location is located at a distance further from said slider than said first location.

6. A method for loading and unloading a slider onto a surface of a substrate, said slider being connected to a load arm, said load arm pivoting about a set of pivot points, said method comprising the steps of:
   rotating said slider toward said surface;
   varying the position of each of said pivot points as said slider is rotated toward said surface such that an axis of rotation of said slider moves from a first location to a second location, said second location being at a distance nearer said slider than said first location; and
   rotating said slider away from said surface.

7. The method of claim 6 further comprising the step of varying said set of pivot points as said slider is rotated away from said surface such that said axis of rotation of said slider moves from said second location to a first location.

8. A method of loading a slider that is coupled to a guide rod onto a substrate surface, said method comprising the steps of:
   (a) biasing said guide rod toward a first bearing, a second bearing and a third bearing such that said guide rod is in continuous contact with said third bearing surface, said second bearing being located between said first and third bearings;
   (b) engaging said guide rod with said first bearing to rotate said slider toward said substrate surface at a first axis of rotation, said first axis of rotation being at a first location; and
   (c) engaging said guide rod with said second bearing to rotate said slider toward said substrate surface at a second axis of rotation, said second axis of rotation being located at a second location, said second location being nearer said slider than said first location.

9. An apparatus for loading and unloading a slider onto a substrate comprising:
   a guide rod coupled to said slider;
   a first bearing;
   a second bearing;
   a third bearing;
   a biasing mechanism coupled to said guide rod; and
   a movement mechanism attached to said third bearing to move said third bearing in relation to said first and second bearings, the movement of said third bearing causing said slider to rotate about a first axis of rotation when said guide rod engages said first bearing and a second axis of rotation when said guide rod engages said second bearing;
   said second bearing being located between said first and third bearings.

10. The apparatus of claim 9 wherein said first, second and third bearing are cylindrical in shape.

11. The apparatus of claim 9 wherein said biasing mechanism comprises a spring.

12. The apparatus of claim 9 wherein said movement mechanism includes a cam coupled to a rotating shaft.

13. The apparatus of claim 9 wherein said substrate comprises a rotating data storage medium.

14. An apparatus for loading and unloading a slider onto a substrate, comprising:
   a load beam having bend zone, a first end and a second end, said load beam attached to a mounting block at said first end, said slider attached to said load beam at said second end;
   a guide rod attached to said mounting block, said mounting block being disposed between said load beam and said guide rod;
   a first lever arm having a first bearing and a second bearing, said guide rod being in continuous contact with said second bearing;
   a second lever arm having a third and fourth bearing, said first and second levers having a common first axis of rotation;
   a biasing mechanism coupled to said guide rod for biasing said guide rod toward said fourth, second and third bearings;
   a first cam, said second bearing attached to said first cam;
   a second cam, said fourth bearing attached to said second cam, said first and second cams having a common second axis of rotation; and a motor attached to said first and second cams for rotating said first and second cams about said second axis of rotation, the rotation of said first and second cams causing said second bearing to move in relation to said first and third bearings, the movement of said second bearing causing said slider to rotate about a first slider axis of rotation as said guide rod engages said first bearing and to rotate said slider about a second slider axis of rotation when said guide rod engages said third bearing.

15. The apparatus of claim 14 wherein said first slider axis of rotation is located at a first location, said second slider axis of rotation being located at a second location, said second location being at a distance nearer said slider than said first location.

16. The apparatus of claim 14 wherein said first section of said load beam comprises a baseplate.

17. The apparatus of claim 16 wherein said first slider axis of rotation is located at a first location, said second slider axis of rotation being located at a second location, said second location being at a distance nearer said baseplate than said first location.

18. The apparatus of claim 14 wherein said load beam comprises a bend located between said first section and said second section to provide a predetermined gram load to said slider when said slider is loaded onto said substrate surface.

19. The apparatus of claim 18 wherein said first slider axis of rotation is located at a first location, said second slider axis of rotation being located at a second location, said second location being at a distance nearer said bend zone than said first location.

20. The apparatus of claim 14 wherein said first, second, third and fourth bearing are cylindrical in shape.

21. The apparatus of claim 14 wherein said biasing mechanism comprises a spring.

22. The apparatus of claim 14 wherein said substrate comprises a rotating data storage medium.

23. A test loader for loading and unloading a first slider and a second slider onto a first surface and second surface of a substrate, respectively, said test loader comprising:

a first load beam having a first section and a second section, said first load beam attached to a first mounting block at said first section, said first slider attached to said first load beam at said second section;

a second load beam having a first section and a second section, said second load beam attached to a second mounting block at said first section, said second slider attached to said second load beam at said second section;

a first guide rod attached to said first mounting block, said first mounting block being disposed between said first load beam and said first guide rod;

a second guide rod attached to said second mounting block, said second mounting block being disposed between said second load beam and said second guide rod;

a first lever arm having a first, second and third bearing, said first guide rod being in continuous contact with said third bearing;

a second lever arm having a fourth, fifth and sixth bearing, said second guide rod being in continuous contact with said sixth bearing, said first and second levers having a common first axis of rotation;

a first biasing mechanism coupled to said first guide rod for biasing said first guide rod toward said fourth, second and third bearings;

a second biasing mechanism coupled to said second guide rod for biasing said second guide rod toward said first, fifth and sixth bearings;

a first cam, said third bearing attached to said first cam;

a second cam, said sixth bearing attached to said second cam, said first and second cams having a common second axis of rotation;

a motor attached to said first and second cams for rotating said first and second cams about said second axis of rotation;

the rotation of said first and second cams causing said first and second lever arms to rotate about said first axis of rotation causing said third bearing to move in relation to said second and fourth bearings, the movement of said third bearing causing said first slider to rotate about a third axis of rotation as said first guide rod engages said second bearing and to rotate said first slider about a fourth axis of rotation when said first guide rod engages said fourth bearing, the rotation of said first and second cams causing said first and second lever arms to rotate about said first axis of rotation further causing said sixth bearing to move in relation to said first and fifth bearings, the movement of said sixth bearing causing said second slider to rotate about a fifth axis of rotation as said second guide rod engages said fifth bearing and to rotate said second slider about a sixth axis of rotation when said second guide rod engages said first bearing surface, said third axis of rotation being located at a first location, said fourth axis of rotation being located at a second location, said second location being at a distance nearer said load beam than said first location; and said fifth axis of rotation being located at a third location, said sixth axis of rotation being located at a fourth location, said fourth location being at a distance nearer said load beam than said third location.

24. The apparatus of claim 23 wherein said first load arm, said first guide rod, said first lever arm, said first biasing mechanism, said first cam, said first bearing, said second bearing and said third bearing are symmetric with said second load arm, said second guide rod, said second lever arm, said second biasing mechanism, said second cam, said fourth bearing, said fifth bearing and said sixth bearing, respectively.

25. The apparatus of claim 23 wherein said first, second and third, fourth, fifth and sixth bearings are cylindrical in shape.

26. The apparatus of claim 23 wherein said first and second biasing mechanisms comprises a spring.

27. The apparatus of claim 23 wherein said substrate comprises a rotating data storage medium.

28. The apparatus of claim 23 wherein said third and fifth axes of rotation are located at a same location.

29. An apparatus for loading and unloading a slider onto a surface of a substrate comprising:

a first element having a first end and a second end, said first end being pivotally attached to a stationary member at a first point;

a second element pivotally coupled to said second end of said first element at a second point, said first and second points being located from each other at opposite ends of said first element; and a slider suspension assembly coupled to said second element and extending outwardly from an end of said second element in a direction away from said stationary member, said slider suspension assembly comprising a flexible load arm, said slider being coupled at an end of said flexible arm, said load arm bending at a third point as said slider is loaded onto said surface of said substrate.

30. The apparatus of claim 29 wherein said surface of said substrate lies within a horizontal plane.

31. The apparatus of claim 29 wherein said second point is displaced horizontally in a first direction as said slider is loaded onto said surface of said substrate.

32. The apparatus of claim 31 wherein said third point is displaced horizontally in a second direction as said slider is loaded onto said surface of said substrate, said second direction being opposite said first direction.

33. The apparatus of claim 32 wherein said first direction is away from said substrate.

34. The apparatus of claim 29 wherein said second element comprises a mounting block.

35. The apparatus of claim 29 wherein said substrate comprises a rotating data storage medium.

36. An apparatus for loading and unloading a slider onto a horizontal surface of a substrate comprising:

a support beam having a first end and a second end, said first end being pivotally attached to a stationary member at a first point;

a mounting block comprising a first side and a second side, said first side pivotally coupled to said second end of said support beam at a second point, said first and second points being located from each other at opposite ends of said first element; and a slider suspension assembly coupled to said mounting block and extending outwardly from said second side of said mounting block, said slider suspension assembly comprising a flexible load arm, said slider being coupled at an end of said flexible arm, said load arm bending at a third point as said slider is loaded onto said surface of said substrate.

37. The apparatus of claim 36 wherein said second point is displaced horizontally in a first direction as said slider is loaded onto said surface of said substrate.

38. The apparatus of claim 37 wherein said third point is displaced horizontally in a second direction as said slider is loaded onto said surface of said substrate, said second direction being opposite said first direction.

39. The apparatus of claim 38 wherein said first direction is away from said substrate.

40. The apparatus of claim 36 wherein said substrate comprises a rotating data storage medium.

\* \* \* \* \*